United States Patent [19]

Kruger

[11] Patent Number: 4,556,617

[45] Date of Patent: Dec. 3, 1985

[54] ANHYDROUS PRIMARY BATTERY

[75] Inventor: Franz J. Kruger, Half Moon Bay, Calif.

[73] Assignee: Raychem Corporation, Menlo Park, Calif.

[21] Appl. No.: 624,647

[22] Filed: Jun. 26, 1984

[51] Int. Cl.$^4$ .................. H01M 6/14; H01M 4/60
[52] U.S. Cl. ............................ 429/196; 429/212; 429/213
[58] Field of Search ................ 429/196, 212, 213

[56] References Cited

U.S. PATENT DOCUMENTS 4,321,114 3/1982 MacDiarmid et al. ......... 429/199 X
4,465,743 8/1984 Skarstad et al. ............... 429/196 X
4,476,204 10/1984 Auborn ............................. 429/196

OTHER PUBLICATIONS

"Use of the Polyacetylene Cathode in Primary Lithium/Thionyl Chloride Cells" U.S. Naval Research Laboratory, Contract No. N00014-82-C-2233, Oct. 1983.

Primary Examiner—Brian E. Hearn
Assistant Examiner—Stephen J. Kalafut
Attorney, Agent, or Firm—Ira D. Blecker; Gene Dillahunty; Herbert G. Burkard

[57] ABSTRACT

There is disclosed an anhydrous primary battery. The battery comprises an anode, an inorganic liquid electrolyte and a cathode. The electrolyte comprises an electrolyte salt in a solvent consisting of oxyhalides or thiohalides. The cathode is a substantially pure material selected from the group of materials consisting of polyacetylene, polypyrrole, polyparaphenylene, polyparaphenylenesulfide, and their derivatives.

13 Claims, No Drawings

ANHYDROUS PRIMARY BATTERY

BACKGROUND OF THE INVENTION

This invention relates to the field of high power primary batteries.

Lithium cells with inorganic nonaqueous solvents such as the oxyhalides or the thiohalides as the cathode depolarizer have been under intensive investigation over the last 15 years. The goal has been to achieve a cell with the highest energy density and best shelf life.

A well known lithium cell is the lithium/thionylchloride-carbon cell containing lithium tetrachloroaluminate as the electrolyte salt. See, for example, "Lithium Batteries," edited by John Paul Gabano, Academic Press (1983).

It was found early on that the capacity and the rate capability of the lithium/thionylchloride systems was greatly dependent on the nature of the carbon electrode. Later, it was concluded that the performance of these systems was most significantly affected by the type of carbon as much as by the techniques used to prepare the cathodes.

The most common way to produce a carbon electrode is by using an aqueous dispersion of carbon black and Teflon ®.* This dispersion is pressed onto a nickel screen and then dried under vacuum at elevated temperatures. While the large surface area of the carbon black electrode is an effective cathode substrate, the rate capability and the capacity of the electrode may be enhanced by using additives, e.g., copper, copper chloride, and platinum.

* Teflon is a registered trademark of E. I. Du Pont de Nemours

The cathode substrate serves only as an electrically conductive surface on which the solvent is reduced. During discharge, the lithium halide which forms gradually fills up the pores of the cathode substrate. If all of the substrate surface is allowed to become covered, the cathode passivates.

An alternative cathode substrate has been tried for some types of lithium cells. It has been found that semiconducting acetylene polymers, such as polyacetylene, can be doped in a controlled manner to produce a whole family of electrically conducting polymers. The doping can occur chemically or electrochemically as is well known to those skilled in the art. See, for example, Heeger et al. U.S. Pat. Nos. 4,204,216 and 4,222,903, and MacDiarmid et al. U.S. Pat. No. 4,321,114.

Thus far, polyacetylene has been used in batteries having only an organic electrolyte. Illustrative are Gray European Pat. Nos. 49 970, 50 441 and 70 107; Matsumura et al. European Pat. No. 76 119; and Japanese Pat. No. 56 52868.

It would be desirable to utilize a polyacetylene cathode substrate in place of the carbon cathode substrate in primary lithium/oxyhalide and lithium/thiohalide cells. Such a substitution is desirable since the polyacetylene has a larger active surface area for reduction of the solvent. Theoretically, higher power density should result.

Research to date, however, has indicated that polyacetylene would not be an acceptable replacement for a carbon cathode substrate in primary lithium/thionylchloride batteries. See "Compatibility of Polyacetylene with Lithium Battery Materials," Report No. GC-TR-82-288, U.S. Naval Research Laboratory Contract No. N00014-82-C-2124. In this report, it was determined that the exposure of polyacetylene to thionylchloride leads to instability of the polyacetylene. The report concluded that the favorable use of polyacetylene in conjunction with thionylchloride, without some form of protective surface coating, is unlikely.

Notwithstanding the negative results of the prior art researchers, it is an object of this invention to use polyacetylene as the cathode substrate in lithium/oxyhalide and lithium/thiohalide primary batteries.

BRIEF DESCRIPTION OF THE INVENTION

According to the invention, there is disclosed an anhydrous primary battery. There is an anode which is preferably lithium. The electrolyte is an inorganic liquid electrolyte and comprises an electrolyte salt in a solvent consisting of oxyhalides or thiohalides. Preferably, the electrolyte is lithium tetrachloroaluminate in thionylchloride. Finally, there is a substantially pure cathode material selected from the group consisting of polyacetylene, polypyrrole, polyparaphenylene, polyparaphenylenesulfide, and their derivatives. Preferably, the cathode material is polyacetylene or polypyrrole.

DETAILED DESCRIPTION OF THE INVENTION

There is disclosed according to the invention an anhydrous primary battery comprising an anode, an inorganic liquid electrolyte and a substantially pure cathode material. The electrolyte comprises an electrolyte salt in a solvent selected from the group consisting of oxyhalides and thiohalides. The cathode material is selected from the group consisting of polyacetylene, polypyrrole, polyparaphenylene, polyparaphenylenesulfide and their derivatives.

It should be understood that "substantially pure" when referring to the cathode material means that the cathode material is free of deleterious amounts of typically objectionable impurities such as catalyst residues. These catalyst residues such as titanium and aluminum compounds, result from the synthesization of polyacetylene.

It should also be understood that "substantially pure" does not refer to certain dopants which are added (chemically or electrochemically) to the cathode material to make it conducting. These dopants may derive from the electrolyte salt or may be added to the cathode material prior to assembly of the battery. These dopants are well known to those skilled in the art. Illustrative of these dopants are $Br_2$, $I_2$, $AsF_5$, and $SbF_5$ when chemically doping and $ClO_4^-$, $BF_4^-$, $AsF_6^-$, $CF_3SO_3^-$, $PF_6^-$, and $AlCl_4^-$ when electrochemically doping.

It has been found that polyacetylene is the preferred choice for the cathode material because it has a fibrous structure thereby providing a high surface area and can be made very thin and flexible in a continuous process. It is believed that polypyrrole would be a good alternative to polyacetylene as the preferred cathode material.

The anode material may be selected from the group consisting of lithium, calcium, sodium, and amalgamates thereof. Preferably, the anode material is lithium.

Alternatively, the anode material may be the same as the cathode substrate material; however, subject to the limitation that the anode may only be substantially pure polyacetylene or its derivatives.

Of course, if the anode and cathode were both made from the same material, for example polyacetylene, they would have to be doped with a suitable electrochemical pair. The anode might be doped with lithium and the cathode would be doped with a suitable counter ion such as tetrachloroaluminate. In this situation, the electrolyte salt would preferably be lithium tetrachloroaluminate.

The electrolyte salt is dissolved in a solvent which is either an oxyhalide or a thiohalide. Preferred solvents are thionylchloride, sulfurylchloride, phosphorylchloride, phosphorylbromide, thionylbromide, chromylchloride, vanadiumoxychloride, and vanadiumoxybromide. The most preferred solvent is thionylchloride.

While it is expected that the disclosed invention can appear in many embodiments, a particularly preferred embodiment is an anhydrous primary battery having a lithium anode, an inorganic liquid electrolyte of lithium tetrachloroaluminate in thionylchloride and a substantially pure cathode material selected from the group consisting of polyacetylene, polypyrrole, polyparaphenylene, polyparaphenylenesulfide, and their derivatives. It is preferred that the cathode material be polypyrrole and most preferred that it be polyacetylene.

The advantages of the present invention will become more apparent after reference to the following examples.

EXAMPLE 1

An anhydrous primary battery according to this invention was constructed. The battery consisted of a polyacetylene cathode, a lithium anode and an electrolyte of 1.6 m $LiAlCl_4$ solution in $SOCl_2$. For measurement purposes, there was also a lithium reference electrode situated adjacent to the polyacetylene cathode. All measurements were carried out in a dry box under pure argon.

The polyacetylene was prepared according to Shirakawa et al. (Synthetic Metals, Vol. 1, p. 175 (1979/1980). The films obtained by this method had a specific density of approximately 0.4 g $cm^3$. The dimensions of the polyacetylene electrode were: length, 1.1 cm; width, 0.6 cm; thickness, 0.014 cm; and weight 2.6 mg. The polyacetylene was contacted with a platinum mesh current collector.

The lithium counter electrode had approximately the same geometrical surface area as the polyacetylene but had a thickness of about 0.5 mm. The lithium was battery-grade lithium foil obtained from Foote Mineral. The lithium was contacted with a nickel mesh current collector.

The cell was filled with 2.5 $cm^3$ of the electrolyte solution which was prepared in the following manner. $SOCl_2$ was distilled over triphenyl phosphate and then redistilled by fractional distillation to yield a colorless liquid free of impurities such as HCl, $S_2Cl_2$, $SCl_2$, and $Cl_2$. It is important to remove these impurities as their presence could adversely impact the performance of the battery. LiCl was dried at 400° C. under vacuum for approximately 12 hours to remove water. $AlCl_3$ was sublimed under vacuum and was free from iron and hydrolysis products. Under an inert atmosphere, stoichiometric amounts of LiCl and $AlCl_3$ were added to $SOCl_2$ in order to obtain a 1.6 m $LiAlCl_4$ solution.

The cell exhibited an initial open circuit voltage of 3.50 volts.

In order to dope the polyacetylene, the potential of the polyacetylene was increased in a stepping mode by 1 mv/sec. The doping was determined at +3.8 volts versus the lithium reference electrode and the number of coulombs measured was 4.853 thereby rendering the polyacetylene highly conductive.

A discharge current of 10 $mA/cm^2$ was applied. The discharge voltage and the number of coulombs during discharge were recorded simultaneously. The following results were obtained:

| plateau voltage: | 3.0 volts | |
|---|---|---|
| discharge capacity: | to 2 volts cutoff: | 38.0 coulombs |
| | to 0.5 volts cutoff: | 39.6 coulombs |

EXAMPLE 2

A cell identical to the one in Example 1 was constructed. The number of coulombs measured by doping the sample up to +3.8 volts was 4.6.

A discharge current of 50 $mA/cm^2$ was applied. The following results were obtained:

| plateau voltage: | 2.6 volts | |
|---|---|---|
| discharge capacity: | to 2 volts cutoff: | 12.4 coulombs |
| | to 0.5 volts cutoff: | 18.7 coulombs |

EXAMPLE 3

Another cell identical to Example 1 was constructed. The number of coulombs measured by doping the sample up to +3.8 volts was 4.78.

A discharge current of 75 $mA/cm^2$ was applied with the following results:

| plateau voltage: | 2.4 volts | |
|---|---|---|
| discharge capacity: | to 2 volts cutoff: | 6.72 coulombs |
| | to 0.5 volts cutoff: | 8.53 coulombs |

EXAMPLE 4

A further cell identical to Example 1 was constructed. The number of coulombs passed with doping was 4.82.

A discharge current of 100 $mA/cm^2$ was applied. The cell voltage dropped constantly without reaching a plateau. The other discharge results were as follows:

| discharge capacity: | to 2 volts cutoff: | 1.44 coulombs |
|---|---|---|
| | to 0.5 volts cutoff: | 1.55 coulombs |

From the results of Examples 1 to 4, the specific capacity (capacity per unit weight) can be calculated for the polyacetylene. The results are summarized in Table I.

TABLE I

| Discharge Current Density ($mA/cm^2$) | Specific Capacity (Ah/g) |
|---|---|
| 10 | 4.17 |
| 50 | 1.32 |
| 75 | 0.72 |
| 100 | 0.15 |

EXAMPLE 5

There was constructed a cell identical to the one described in Example 1 with the exception that a teflon-bonded acetylene black electrode was substituted for the polyacetylene electrode.

The electrode was manufactured by pasting a slurry consisting of an aqueous dispersion of teflon (6%) and Shawinigan Black (94%) onto a nickel mesh current collector. The electrode was then pressed and heat treated under vacuum to remove water. The dimensions of the electrode was as follows: length, 2.5 cm; width, 1.25 cm; thickness, 0.07 cm; and weight, 110 mg.

Approximately 6 cm$^3$ of the electrolyte solution was added to the cell. The cell showed an open circuit voltage of 3.72 volts.

To discharge the cell, a discharge current of 10 mA/cm$^2$ was applied with the following results:

| plateau voltage: | 3.2 volts | |
|---|---|---|
| discharge capacity: | to 2 volts cutoff: | 396 coulombs |

EXAMPLE 6

A cell identical to Example 5 was constructed. In this example, a discharge current of 50 mA/cm$^2$ was applied. The cell voltage dropped constantly without reaching a plateau. The other discharge results were as follows:
discharge capacity: to 2 volts cutoff: 158.4 coulombs

EXAMPLE 7

Another cell identical to FIG. 5 was constructed. When a discharge current of 75 mA/cm$^2$ was applied, the following results were obtained:
discharge capacity: to 2 volts cutoff: 39.6 coulombs
The cell voltage dropped constantly without reaching a plateau.

The specific capacity of the carbon electrode versus current density was calculated. Those results are tabulated in Table II.

TABLE II

| Discharge Current Density (mA/cm$^2$) | Specific Capacity (Ah/g) |
|---|---|
| 10 | 1.0 |
| 50 | 0.4 |
| 75 | 0.1 |

The advantages of the invention become apparent when Tables I and II are compared. It is evident that polyacetylene is highly superior as an electrode material to conventional teflon-bonded carbon electrodes in terms of the capacity of the battery on a weight basis.

Thus, at a discharge current density of 10 mA/cm$^2$, the polyacetylene electrode battery is more than 4 times as powerful as the carbon electrode battery. At a discharge current density of 50 mA/cm$^2$, the polyacetylene electrode battery is more than 3 times as powerful and at a discharge current density of 75 mA/cm$^2$, it is more than 7 times as powerful.

It will be obvious to those skilled in the art, having regard to this disclosure, that other modifications of this invention beyond those embodiments specifically described here, may be made without departing from the spirit of the invention. Accordingly, such modifications are considered to be within the scope of the invention as limited solely by the appended claims.

I claim:

1. An anhydrous primary battery comprising an anode; an inorganic liquid electrolyte comprising an electrolyte salt in a solvent selected from the group consisting of oxyhalides and thiohalides; and a substantially pure cathode material selected from the group consisting of polyacetylene, polypyrrole, polyparaphenylene, polyparaphenylenesulfide, and their derivatives.

2. The battery of claim 1 wherein said cathode material is polyacetylene.

3. The battery of claim 1 wherein said cathode material is polypyrrole.

4. The battery of claim 1 wherein said anode is selected from the group consisting of lithium, calcium, sodium, and amalgamates thereof.

5. The battery of claim 4 wherein said anode is lithium.

6. The battery of claim 1 wherein said anode is selected from the group of substantially pure materials consisting of polyacetylene and its derivatives.

7. The battery of claim 5 wherein said electrolyte salt is lithium tetrachloroaluminate.

8. The battery of claim 6 wherein said electrolyte salt is lithium tetrachloroaluminate.

9. The battery of claim 1 wherein said solvent group consisting of oxyhalides and thiohalides consists of thionylchloride, sulfurylchloride, phosphorylchloride, phosphorylbromide, thionylbromides, chromylchloride, vanadiumoxychloride, and vanadiumoxybromides.

10. The battery of claim 9 wherein said solvent is thionylchloride.

11. An anhydrous primary battery comprising a lithium anode; an inorganic liquid electrolyte comprising lithium tetrachloroaluminate in thionylchloride; and a substantially pure cathode material selected from the group consisting of polyacetylene, polypyrrole, polyparaphenylene, polyparaphenylenesulfide, and their derivatives.

12. The battery of claim 11 wherein said cathode material is polyacetylene.

13. The battery of claim 11 wherein said cathode material is polypyrrole.

* * * * *